July 19, 1938.　　　G. P. LUCKEY ET AL　　　2,124,072
INDICATING INSTRUMENT
Filed March 25, 1930
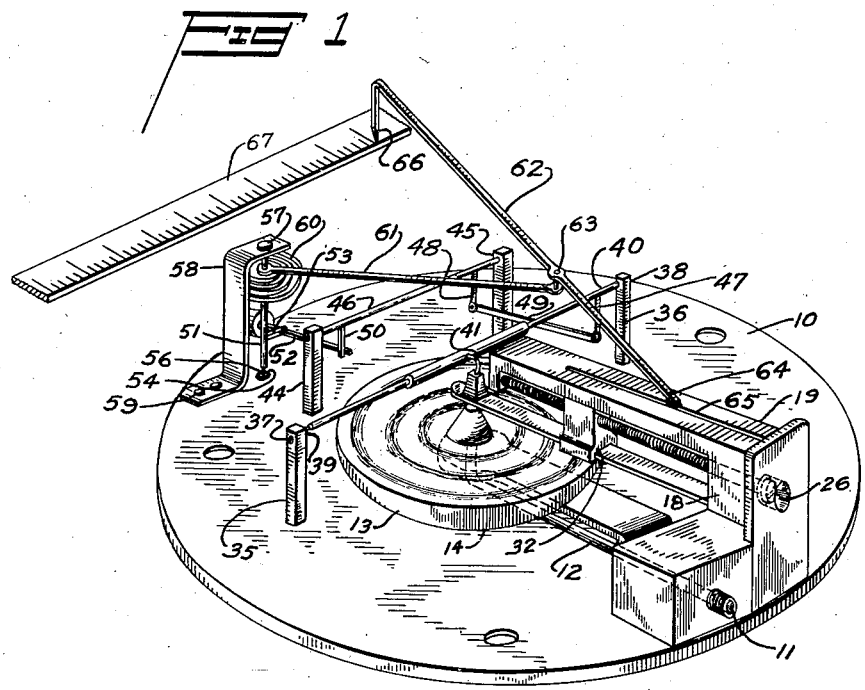
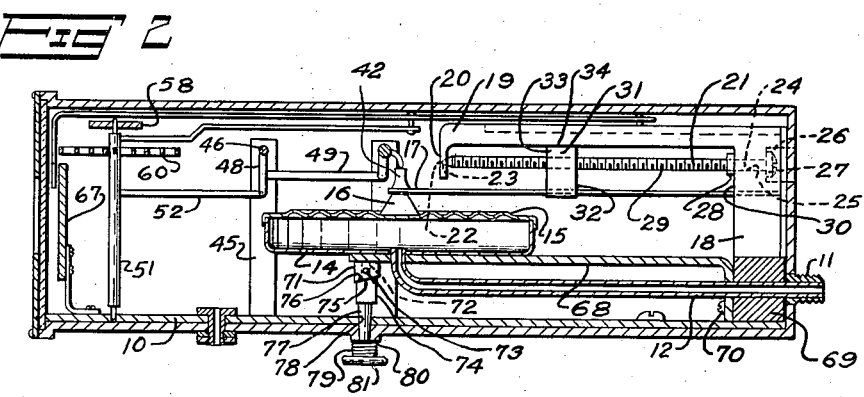
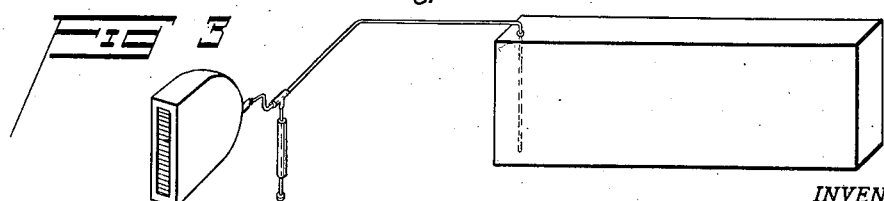
INVENTORS
George P. Luckey
and Arnold Soller.
BY Robert H. Young
ATTORNEY Patented July 19, 1938

2,124,072

UNITED STATES PATENT OFFICE 2,124,072

INDICATING INSTRUMENT

George P. Luckey, Lancaster, Pa., and Arnold Soller, Michigan City, Ind.

Application March 25, 1930, Serial No. 438,889

6 Claims. (Cl. 73—110)

This invention described herein may be manufactured and used by or for the Government for governmental purposes, without the payment to us of any royalty thereon.

The present invention relates generally to improvements in indicating instruments and more particularly to instruments of the type in which a small motion of an actuated member is to be multiplied for indicating or recording purposes, for example, and as one embodiment of the invention, to apparatus for indicating variations of head pressure in a container, more particularly through the effect of pressures acting upon a distensible member or diaphragm.

In the embodiment of the invention herein shown, the type of instrument illustrated is one particularly intended for indicating the depth or head of liquid in fuel tanks, of aircraft, automobiles or the like, although the improvements are not necessarily limited to that particular type of instrument.

The present invention has as one of its principal objects the provision of a pressure indicating instrument having a diaphragm or distensible membrane wherein the motion of the diaphragm or membrane in expanding or contracting is utilized to effect a movement of an indicator mechanism.

A further object of the invention is to provide a pressure indicating instrument having a variable pressure controlling element which permits the gauge to be substantially universally adapted for use in measuring or indicating the depth of fuel in fuel tanks having different fuel depths and capacities; thus an instrument of this type which will indicate, uniformly, over a given scale, depths from 0–10 inches of fuel can easily be changed to an instrument having a uniform scale reading over the same scale to indicate depths of liquid from 0–40 inches of fuel by varying the pressure controlling element and still retain the full scale reading for each range, which reading will be directly proportional to the head pressure being measured.

The invention is further characterized by the provision of a pressure indicating instrument which is economical of manufacture, efficient in operation and which is exceedingly strong, durable, and insusceptible to derangement due to shock or vibration.

Generally speaking our invention consists of a pressure indicating instrument and a conduit extending therefrom and having its other end located at or near the bottom of the fuel tank or other liquid container. The instrument comprises generally a pressure receiving chamber having a distensible diaphragm forming one of its walls with which is associated a suitable motion multiplying and indicating mechanism. The pressure received in the conduit and pressure receiving chamber is produced by the head of liquid in the container tending to force a certain head of liquid through the conduit against the confined air therein. This pressure varies proportionally to the depth or head of liquid.

An instrument constructed in accordance with our invention may be used in measuring pressures other than liquid, for instance it may be used to measure steam pressure or gas pressure, or it may be used as an altitude instrument for measuring the difference in pressure existing between atmospheric pressure and the pressure within the chamber, in which case the chamber would be sealed.

Broadly the invention consists in providing in instruments of the above class suitable means for calibrating the indicating mechanism of an instrument to read directly proportional to any predetermined pressure.

With the above and other objects in view, our invention consists in the novel construction and arrangement of parts which will hereinafter be fully, clearly, and concisely described, pointed out in our claims, and illustrated in the accompanying drawing, in which—

Fig. 1 is a view in perspective of a pressure indicating instrument embodying the preferred form of our invention.

Fig. 2 is a side plan view partially in section showing the relation between the diaphragm and variable pressure controlling element employed in accordance with our invention, and Fig. 3 is a diagrammatic view which illustrates the manner in which the instrument is connected to a fuel container.

Inasmuch as the fuel tanks used on present-day aircraft vary considerably in their shape and depth, many having depths ranging from 10–50 inches, it is necessary to provide some type of means whereby to adjust the indicating instrument to compensate for these variations in tank depth so that the same instrument can be used with fuel tanks of varying depths and still retain a full and correct scale reading for the various tanks. Gasoline being lighter than water, the pressure on the air confined in the conduit, due to the difference in level between the gasoline in the tank and that in the conduit after the same has risen as high therein as the compressibility of confined air permits, is comparatively slight even when the tank is full.

It results, therefor that the distensible element which responds to variations in this pressure must be very sensitive, and its motions which are necessarily slight must correspond accurately to pressure changes. In other words, it is vital to the accurate functioning of the instrument that some portion of the element must occupy the same position every time a given pressure occurs, any changes due to the effects of temperature, of course, being excepted.

Referring more particularly to the drawing in which similar parts are designated by like numerals throughout the various views thereof, the pressure indicating instrument in the embodiment of our invention herein illustrated comprises generally a base member 10. This base member is conveniently provided with a threaded nipple 11 to be placed in communication with a source of pressure to be measured. The inner end of the nipple is connected with a pipe 12 which communicates at its other end with the underside of the pressure receiving chamber generally indicated by numeral 13. In order to meet the requirements heretofore mentioned, we employ a pressure receiving chamber which comprises a rigid member or casing 14 and a distensible element or diaphragm 15 having its edges soldered or otherwise secured to the casing 14, and in order that this diaphragm, which is preferably of German silver, may bend under the influence of the applied pressure, and also in order that the greatest motion of the diaphragm may be caused to always take place at a given point and to a certain extent for given pressures, the diaphragm is provided with circular, concentric corrugations, as shown in Fig. 1 and Fig. 2. The effect of these corrugations is to cause the greatest motion of the diaphragm to be at its center and to prevent distortion at other points on its surface. Inasmuch as the pressure receiving chamber is rigid, except the diaphragm, variations in pressure are effective on the diaphragm only.

A spacing block 16 is provided on the diaphragm which is adapted to bear against the free end of a spring 17 preferably made of a flat steel band securely clamped within a supporting member 18 at its other end. It will be readily understood that this arrangement permits of the free, effective length of the spring, which is in contact with the diaphragm, to flex up or down with the diaphragm when that member expands or contracts in the operation of the instrument.

The supporting member 18 is also formed with an arm 19 adapted to partially overlie the diaphragm 15 and in spaced relation therefrom, a portion of which arm is bent over at right angles; thus forming an end plate 20. An adjustable screw 21 having a pointed end, as shown at 22, is mounted to turn in a suitable bearing 23 provided in the end plate 20. In a like manner the adjusting screw is provided with a bearing portion 24 on its other end which bears in a journal 25 provided in the supporting member 18, the longitudinal axis of the adjusting screw being arranged to lie in a plane parallel to the arm 19 of the supporting member. The supporting member is suitably counter-bored, as shown at 26, to receive the slotted head 27 of the adjusting screw 21 therein, this arrangement permitting of the reception of any conventional tool such as a screw driver or the like whereby to turn the adjusting screw for a purpose hereinafter to be more fully described. A removable collar 28 is screwed or otherwise fixedly mounted on the threaded portion 29 of the adjusting screw 21 and so positioned as to abut against the inside face 30 of the supporting member 18, the purpose of the collar being to position the adjusting screw within its bearings and prevent its accidental displacement therefrom after being assembled in place.

Adjustably threaded onto the screw 21 is a fulcrum block 31 forming an adjustable holding member for the spring 17 the fulcrum block 31 being provided with a slot 32 within which spring 17 is adapted to be slidably inserted. The fulcrum block 31 is conveniently provided with a bearing surface 33 adapted to bear against the underside 34 of the arm 19 which prevents binding of the fulcrum block when moved longitudinally along the arm 19. The mechanism hereinbefore described comprises generally the variable pressure controlling element and is substantially the essence of our invention, and it will be apparent that upon turning the adjusting screw 21 a longitudinal movement will be imparted the fulcrum block along the length of the adjusting screw, which movement increases or decreases the effective, free length of the spring thereby creating a device which is generally effective in controlling the flexure of the spring and consequently the distension of the diaphragm element. It will be seen that the length of the spring and limits of adjustment of the flexure thereof will permit of a range of adjustments substantially wide in their scope. From the description thus far, it will be obvious that as the fulcrum block is moved to the left, reference being made to Fig. 2 of the drawing, the effective length of the spring is decreased, consequently its resistive effect upon the diaphragm element will be increased, and when moved to the right the effective length of the spring will be increased and the resistive effect of the spring upon the diaphragm element decreased. In this manner the resistive effect of the spring upon the diaphragm element may be varied as required or desired in meeting the exigencies of each special application.

It is to be understood that any type of indicating mechanism can be used, but in the form of our invention herein shown, we prefer to use an indicating mechanism of the type having a straight line motion. To this end the base member 10 is shown as carrying a plurality of upright supports 35 and 36, respectively, positioned as to lie in a plane slightly off-set from the center of the diaphragm 15 as shown in Fig. 2, and further positioned at right angles to the longitudinal axis of the arm 19 and adjusting screw 21 heretofore mentioned. These supports are suitably provided with journal bearings 37 and 38 adjustably mounted within the supports and adapted to receive the pointed ends 39 of a primary shaft 40 simulating a bell crank lever arrangement. One arm 41 of the bell crank lever is adapted to bear against the spring 17 through the medium of a spacer block 42. It will be apparent that the motion of the diaphragm in expanding or contracting will effect a rotational movement of the shaft 40 by means of the arrangement hereinbefore described.

A second set of bearing supports 44 and 45 spaced from but lying parallel to the primary shaft 40 are mounted on the base member 10 in a manner similar to that in which the supports hereinbefore mentioned are mounted which in turn carry a secondary shaft 46 rotatably mounted within the said supports. The method of mounting the secondary shaft is carried on in a manner similar to that of the primary shaft, and a description of the one will suffice for both.

A suitable linkage for transmitting the motion of the primary shaft to the secondary shaft is provided in the form of a rod 47 forming the other arm of the bell crank lever arrangement heretofore mentioned fixedly mounted in the one end of the primary shaft, the said rod being connected to a similarly fixed rod 48 mounted on a secondary shaft by means of linked member 49. It will be noted that the length of the rod 48 is less than that of the rod 47 in order that a differential movement between the primary and secondary shaft is effected.

The motion of the secondary shaft is transmitted through the arm member 50 to a motion-control shaft 51 by means of a link 52 pivotally secured to the arm member 50 at its one end, and in a like manner to a pivot arm 53 fixed in the control shaft and at right angles to the longitudinal axis thereof. The control shaft is conveniently pivotally mounted at right angles to the secondary shaft 46 and is also suitably pointed at its end as shown by numeral 54, these pointed ends being adapted to bear in journals 56 and 57 provided in the base member 10 and a bracket 58 respectively, the latter being secured to the base member 10 as by screws 59.

A coiled spring 60 is provided, the ends of which are secured to the control-shaft 51 and bracket 58 respectively to insure of the motion-control shaft being returned to its initial position when rotated by the movement of the mechanism heretofore described. One arm 61 of an indicator mechanism is fixedly mounted on the shaft 51, the other end of which carries an indicator 62 which is provided with a fixed pivot point 63 and a movable pivot 64 arranged to move back and forth in a guideway 65 provided in the arm of the supporting member 18. The relation of the arm 61 and indicator 62 is such that as the arm 61 is rotated by the expansion of the diaphragm, the indicator, in pivoting about its fixed pivot 63 and the movable pivot 64, will effect a movement of a pointer 66 provided on its free end, the movement of which will be approximately in a straight line whereby to register on a scale 67 herein shown as being calibrated in units of fuel depth.

It is intended that the instrument shall be provided with a zero adjustment in the event of any expansion or contraction of the metallic parts due to temperature changes. To this end, it is intended that the casing 14 of the diaphragm shall preferably be rigidly mounted upon a flexible tongue-carrying member 68 secured to the lower part 69 of the supporting member 18 by means of screws 70. Mounted upon the underside of the tongue member 68 is a block 71 having an opening 72 therein adapted to receive the plunger 73 of an adjusting device 74. This device is provided with a cam face 75 which is adapted to bear against a similarly shaped cam face 76 provided on the block 71. The adjusting device is formed with a tapered shank 77 adapted to fit within a tapered opening 78 provided in the base member 10. A tensioned spring 79 is fitted between the outer face 80 of the base member and an adjusting nut 81 mounted on the end of the tapered shank which holds the adjusting device in any adjusted position. It will be apparent from the foregoing that a movement of the adjusting device right or left will effect a bodily movement of the diaphragm up or down which movement of the diaphragm is instrumental in adjusting the indicator mechanism of the instrument to a zero position to compensate for changes in temperature.

From the foregoing description, it will be apparent that the instrument is readily adaptable to fuel tanks of varying depths wherein it is intended that a full scale reading shall be obtained regardless of the depth of fuel of the tank.

While I have illustrated and described the preferred form of construction for carrying our invention into effect, it is to be understood that variations and modifications may be had without departing from the spirit of the invention. We, therefore, do not wish to be limited to the precise details of construction set forth, but desire to avail ourselves of such variations and modifications as may come within the scope of the appended claims.

Having thus described our invention, what we claim as new and desire to secure by Letters Patent is:

1. A pressure indicating instrument for indicating the static head of liquid in a container comprising a casing, a pressure actuated expansible member yieldingly supported within said casing a pressure communicating tube leading from said container to said pressure actuated expansible member for applying thereto the static head of liquid pressure in said container, indicating mechanism operatively connected to said pressure actuated member, and manually operated means extending externally of said casing adapted for readily moving said member bodily relative to said indicating mechanism to compensate for movements of said pressure actuated member due to expansion and contraction.

2. A pressure indicating instrument for indicating the static head of liquid in a container comprising a casing, a pressure actuated expansible member in said casing a pressure communicating tube leading from said container to said pressure actuated expansible member for applying thereto the static head of liquid pressure in said container, a yieldable support for said expansible member, indicating mechanism operatively connected to said pressure actuated member and a manually operated device extending externally of said casing and connected to said yieldable support for moving said support and expansible member bodily to adjust said indicating mechanism to compensate for errors occurring therein due to expansion or contraction in said instrument.

3. A pressure indicating instrument for indicating the static head of liquid in a container comprising a casing, a pressure actuated expansible member in said casing, a yieldable support for said expansible member, indicating mechanism operatively connected to said pressure actuated member, and means externally of said casing and connected to said yieldable support for moving said expansible member bodily to adjust said indicating mechanism to correct for errors due to expansion or contraction in said instrument, said means comprising a cam element attached to said yieldable support, a cooperating cam element contacting with said first mentioned element, rotation of which moves said yieldable support, and a manually operated adjusting nut externally of said casing and connected to said cooperating cam element for rotating the same.

4. An adjustable range pressure indicating instrument for indicating a predetermined depth of liquid in a container comprising a casing, a supporting member within said casing, a pressure actuated expansible member carried by said supporting member, an indicator having an operating mechanism connected therewith, a scale of given calibration over which the indicator operates, an elongated flat spring secured at its one end to said supporting member and having its free end interposed between and in direct contact with said indicator mechanism and said pressure actuated member adapted to resist the expansion of said pressure actuated member, means for adjusting said spring to the desired effective length to obtain equivalent readings of said indicator over said scale corresponding to predetermined static heads of liquid pressure, and means to compensate for movement of said pressure actuated member resulting from expansion or contraction due to temperature changes, said means comprising a manually operated device cooperating with said expansible member and its support to bodily shift said expansible member relative to said operating member and correct the reading of said indicator.

5. An adjustable range pressure indicating instrument for indicating a predetermined depth of liquid in a container comprising a casing, a supporting member within said casing, a pressure actuated expansible member carried by said supporting member, an indicator having an operating mechanism connected therewith, a scale of given calibration over which the indicator operates, an elongated flat spring secured at its one end to said supporting member and having its free end interposed between and in direct contact with said indicator mechanism and said pressure actuated member adapted to resist the expansion of said pressure actuated member, means for adjusting said spring to a desired effective length to obtain equivalent readings of said indicator over said scale corresponding to predetermined static heads of liquid pressure, and means to compensate for movement of said pressure actuated member resulting from expansion or contraction due to temperature changes, said means comprising a manually operable device extending externally of said instrument and cooperating with said pressure actuated member adapted when operated to move said member relative to said operating mechanism to thereby effect a movement of said indicator relative to its scale.

6. In a fluid pressure gauge having a casing and a reciprocating member actuated by the pressure and adapted to impart rotary movement to an indicating hand, a straight spring adapted to directly engage said member and to resist movement of said member in one direction, the effective length of said spring being adjustable to increase its resistance to said pressure-actuated movement without increasing its initial tension upon said reciprocating member, and screw means accessible from outside the casing for adjusting said effective length.

GEORGE P. LUCKEY.
ARNOLD SOLLER.